May 12, 1953 G. C. HARTLEY ET AL 2,638,267

BINARY MULTIPLYING CIRCUIT

Original Filed June 24, 1943 4 Sheets-Sheet 1

Inventors
George Clifford Hartley.
William John Reynolds.
By [signature]
Attorney

BINARY MULTIPLYING CIRCUIT

Original Filed June 24, 1943 4 Sheets-Sheet 2

Inventors
George Clifford Hartley.
William John Reynolds.
By Edward D. Phinney
Attorney

BINARY MULTIPLYING CIRCUIT

Original Filed June 24, 1943 4 Sheets-Sheet 3

Inventors
George Clifford Hartley.
William John Reynolds.
By Edward D. Phinney
Attorney May 12, 1953 G. C. HARTLEY ET AL 2,638,267

BINARY MULTIPLYING CIRCUIT

Original Filed June 24, 1943 4 Sheets-Sheet 4

INVENTORS
GEORGE C. HARTLEY
WILLIAM J. REYNOLDS
BY
Edward D. Phinney
ATTORNEY

Patented May 12, 1953

2,638,267

UNITED STATES PATENT OFFICE 2,638,267

BINARY MULTIPLYING CIRCUIT

George Clifford Hartley and William John Reynolds, London, England, assignors, by mesne assignments, to International Standard Electric Corporation, New York, N. Y., a corporation of Delaware Continuation of application Serial No. 492,060, June 24, 1943. This application February 28, 1948, Serial No. 11,896. In Great Britain May 10, 1941

Section 1, Public Law 690, August 8, 1946
Patent expires May 10, 1961

5 Claims. (Cl. 235—61)

This invention relates to electrically operated calculating equipment for performing multiplication operations, and is a continuation of application Serial No. 492,060, filed June 24, 1943, now abandoned.

In application Ser. No. 494,282, filed July 12, 1943, now Patent No. 2,601,281, there has been described and claimed electrically operated calculating equipment arranged to perform calculations in radix 2. The particular calculations described were those of addition and subtraction.

According to one feature of the present invention electrically operated calculating equipment is arranged to perform multiplication operations in radix 2.

A number in radix two will have 2 as a base instead of 10, which is the base of the ordinary numbering system. Each digit of a number in radix two is either 0 or 1. When 1 is added to a digit of a radix two number and the resultant comes to more than 1, 0 is entered and 1 carried to the next denomination. The radix two numbers corresponding to radix 10 numbers from 1 to 12 are as follows:

| Radix ten | Radix two | Radix ten | Radix two |
|---|---|---|---|
| 1 | 1 | 7 | 111 |
| 2 | 10 | 8 | 1000 |
| 3 | 11 | 9 | 1001 |
| 4 | 100 | 10 | 1010 |
| 5 | 101 | 11 | 1011 |
| 6 | 110 | 12 | 1100 |

The nature of the invention will be better understood from the following description taken in conjunction with the accompanying drawings in which.

Figure 1:
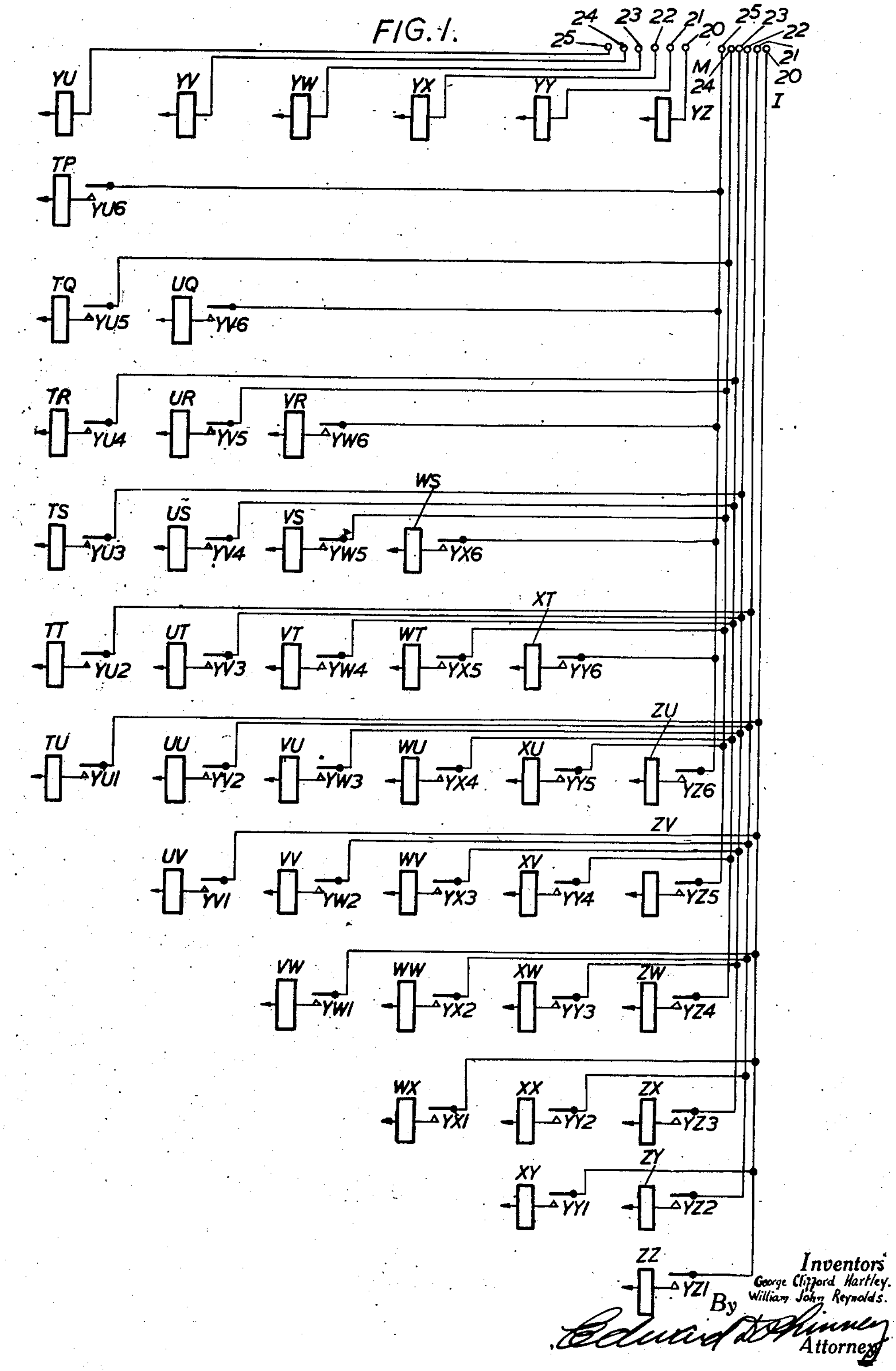
Fig. 1 is a circuit diagram of a portion of one form of the apparatus.

The drawings show electric circuits by means of which a multiplicand may be entered into electrically operated calculating equipment, the calculation performed in radix two, and the result of the multiplication automatically obtained. In the circuits shown the multiplicand and the multiplier are entered as numbers expressed in radix two and the solution obtained as a number expressed in radix two. Provision is made for entering numbers of up to six denominations.

In the drawings relays have been designated by a letter or letters. The contacts for these relays are shown distributed over the various figures in the circuits which they control, rather than in close association with the relays to which they belong. The contacts are designated by the letter or letters of the relay to which they belong followed by a number to differentiate contacts of the same relay. This arrangement avoids a complex wiring diagram and makes the drawing easier to read and understand. Filled-in arrows have been used to represent battery throughout the several figures.

The circuits are such as to carry out operations exactly analogous to those performed in long hand multiplication. Consider the manner in which a number, the successive digits of which are *a, b, c, d, e, f* (in radix two) is multiplied by another number, the successive digits of which are *a′, b′, c′, d′, e′, f′*.

The calculation can be set down as follows:

```
          a  b  c  d  e  f
          a' b' c' d' e' f'
          -----------------
          a  b  c  d  e  f
       a  b  c  d  e  f
    a  b  c  d  e  f
 a  b  c  d  e  f
a b  c  d  e  f
a b c d e f
```

The first row represents the multiplicand, the second row the multiplier. Succeeding rows represent the partial products obtained by multiplying the digits of the multiplicand by successive digits of the multiplier starting from the digit of lowest denomination. As each digit of the multiplier can only be 1 or 0, each row represents the multiplicand displaced one denominational place as compared with the row above and it must be considered that a row is omitted if the corresponding digit of the multiplier be 0. The solution is then obtained by adding the digital values in each denomination and carrying over any necessary values to be included in the total to be obtained for the next higher denominational value.

Referring to the drawings, Fig. 1 is a circuit diagram of an apparatus for obtaining the partial products to be added in order to obtain the solution. The multiplicand is entered on the terminals I, there being one terminal for each digit of the multiplicand. The value of each digit is represented by the presence or absence of ground on the corresponding terminal in entering the digit, ground being applied if the digital value be one, and there is no ground if the digital value be 0. The multiplier is entered in a similar manner on terminals M. Relays YU—YZ are operated or not operated in accordance with the value of the respective digits of the multiplier. The remainder of the relays shown in Fig. 1 then become operated or remain unoperated in accordance with digital values of the products of the digits of the multiplicand and the multiplier.

The separate terminals of the sets of terminals I and M are denoted by the denominations of the corresponding digits. If the digits of lowest denomination in the multiplier has the value 1, relay YZ is operated and by its contacts YZ1—YZ6 connects the terminals I for the the respective denominations $2^0$ . . . $2^5$ to relays ZZ—ZU. Those of the last mentioned relays which corresponding to digits of the multiplicand having the value 1 accordingly operate, those corresponding to digits of the multiplicand having the value 0 remain unoperated. If, on the other hand, the digit of lowest denomination in the multiplier has the value 0, relay YZ is not operated and none of the relays ZZ—ZU is operated. Thus the operated or non-operated conditions of the relays ZZ—ZU represent the products of the respective digits of the multiplicand by the digit of lowest denomination, i. e. $2^0$ in the multiplier.

Similarly, the operated or non-operated conditions of the relays XT—XY represent the values of the products of the respective digits of the multiplicand by the digit of denomination $2^1$ in the multiplier. As any one of these products involving a particular digit of the multiplicand is of the next higher denomination to the corresponding product involving the digit of denomination $2^0$ of the multiplicand, the relays XY—XT have been shown displaced as compared with the corresponding relays ZZ—ZU.

Similarly, the other partial products are represented by the other relays. If the above mentioned calculation be now set down again with the relay designations for the digits the values of which the conditions of the relays represent, it will appear as follows:

| | | | | | a | b | c | d | e | f |
|---|---|---|---|---|---|---|---|---|---|---|
| | | | | | YU | YV | YW | YX | YY | YZ |
| | | | | | ZU | ZV | ZW | ZX | ZY | ZZ |
| | | | | XT | XU | XV | XW | XX | XY | |
| | | | WS | WT | WU | WV | WW | WX | | |
| | | VR | VS | VT | VU | VV | VW | | | |
| | UQ | UR | US | UT | UU | UV | | | | |
| TP | TQ | TR | TS | TT | TU | | | | | |

The result of the calculation may then be obtained by adding together the values of the digits represented by the conditions of the relays in the columns shown above, starting from the right, carrying over any necessary values to be included in the addition for the next higher denomination.

Figure 2:
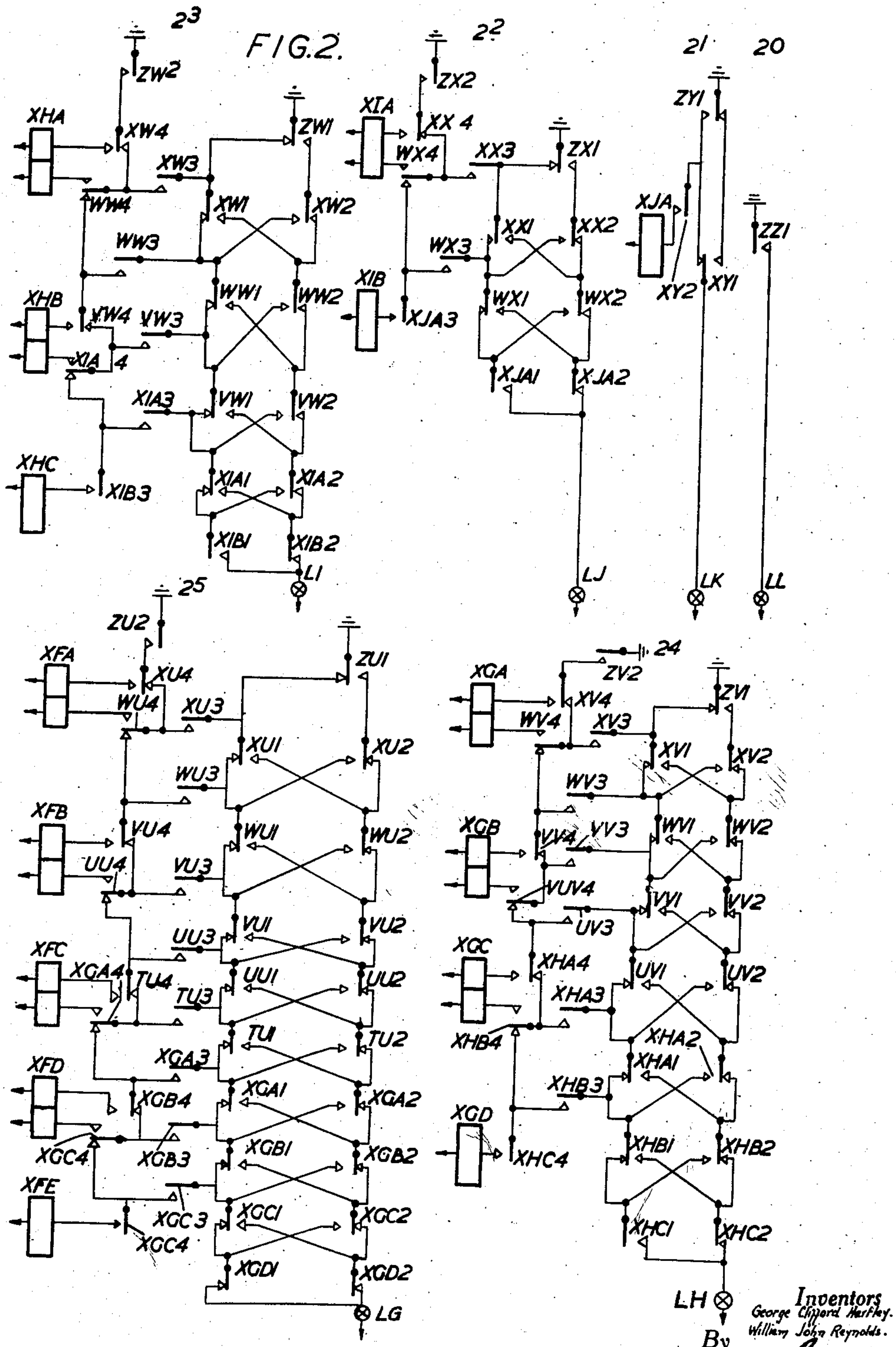
Figs. 2 and 3 are circuit diagrams of the remaining portions of the apparatus.
Figure 3:
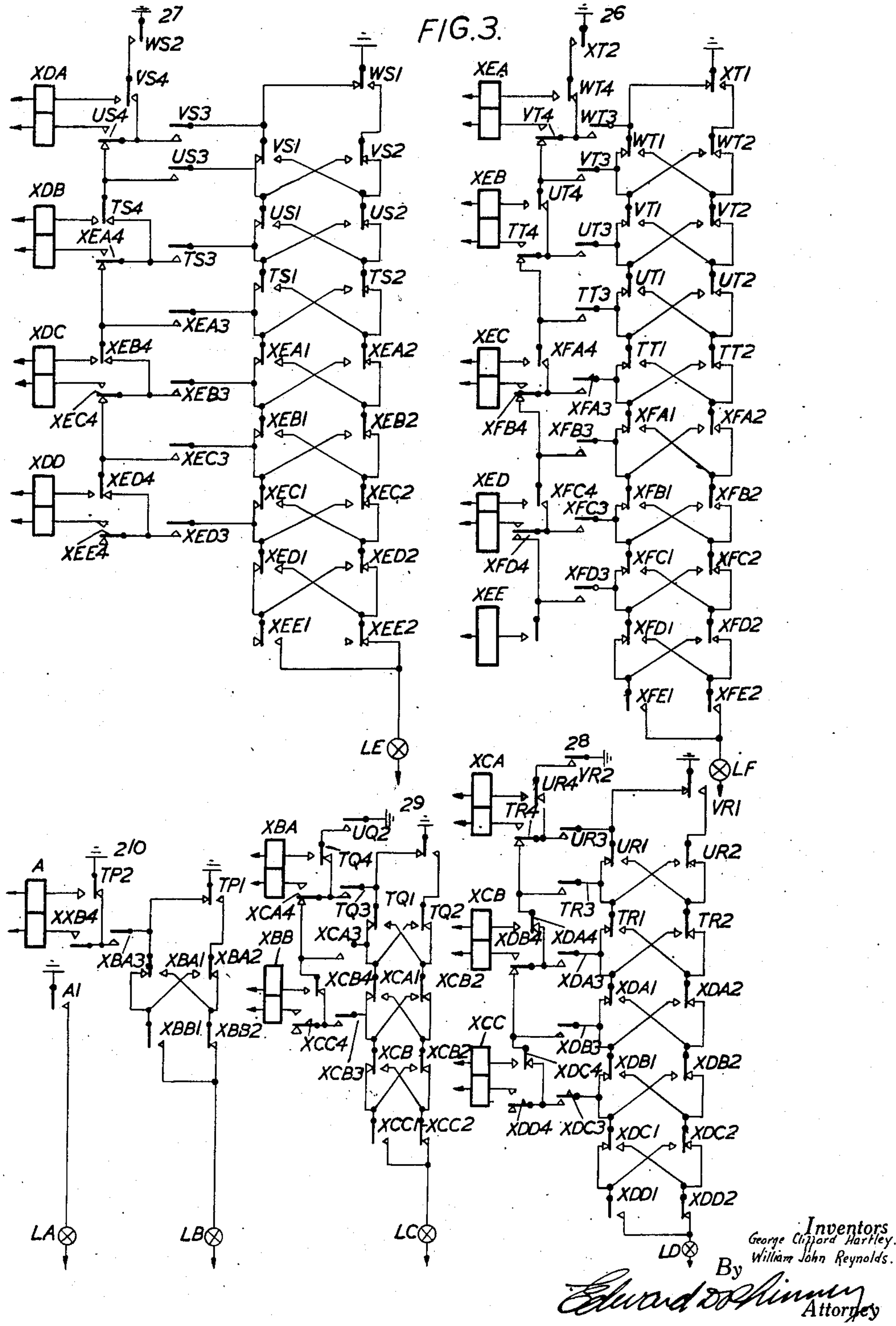

The circuits for performing this addition are shown in Figs. 2 and 3 which contain the contacts of the relays of Fig. 1 with certain additional relays and contacts. Figs. 2 and 3 are divided into sections, each showing the circuit for the addition for a given denomination. The solution is obtained on lamps LA—LL which are shown scattered around on the figures, lamps LA—LF being shown in Fig. 3, while lamps LG—LL are shown in Fig. 2. There is one lamp for each digit, the circuit for a lamp being completed if the value of the digit is 1, so that in such case the lamp is lit. A lamp is not lit if the value of the corresponding digit is zero. The solution is obtained substantially instantaneously, i. e. in one stage only and the time taken being only that required to operate a few fast operating relays in immediate succession.

In obtaining the sum, the following principles are utilised:

(*a*) In any column, representing a particular denomination, the answer in that column is 1 if the total of the column and carry over is odd, and the answer is 0 if such total is even.

(*b*) The carry over to the column of next higher denomination is the number of pairs in the sum of the column total and the carry over.

The digit of lowest denomination is represented by lamp LL (Fig. 2, center right), the circuit of which is completed at front contacts ZZ1, if ZZ, (Fig. 1), is operated. It is clear that relay ZZ could be omitted and the circuit of lamp LL completed directly from terminal $2^0$ of the set I over front contacts YZ1.

Lamp LK represents the digit of denomination $2^1$, its circuit being completed over contacts ZY1 back and XY1 front, or ZY1 front and XY1 back. If both relays ZY and XY are operated, there is no circuit for lamp LK, and a carry over relay XJA is operated by front contacts XY2 to carry over a digital value 1 to denomination $2^2$.

Lamp LJ represents the digit of denomination $2^2$. Its circuit is completed if an odd number of the four relays ZX, XX, WX and XJA is operated, and is not completed if an even number of these relays is operated.

The contacts over which the circuit of the lamp is completed are:

ZX1 front, XX2 back, WX2 back, XJA2 back.
ZX1 front, XX2 back, WX2 front, XJA1 front.
ZX1 front, XX2 front, WX1 back, XJA1 front.
ZX1 front, XX2 front, WX1 front, XJA2 back.
ZX1 back, XX1 back, WX1 back, XJA1 front.
ZX1 back, XX1 back, WX1 front, XJA2 back.
ZX1 back, XX1 front, WX2 back, XJA2 back.
ZX1 back, XX1 front, WX2 front, XJA1 front.

The value to be carried over to the next higher denomination is 2, if all four relays are operated, or 1, if any two or three out of the four relays are operated, or 0, of one only or none of the four relays is operated. Relays XIA and XIB are provided for this purpose. Relay XIA is operated over ZX2 front, XX4 front, if both relays ZX and XX are operated, or over ZX2 front, XX4 back, WX4 front if both relays ZX and WX are operated, and relay XX is not operated, whilst relay XIB is operated if all four relays are operated over ZX1 front, XX2 front, WX3 front, XJA3 front, or, if relay ZX is operated, both relays XX and WX are not operated (so that relay XIA is not operated), and relay XJA is operated over ZX2 front, XX4 back, WX4 back, XJA3 front. Thus, one or the other of the carry-over relays XIA and XIB is operated whenever there is 1 to carry over to denomination $2^3$, and whenever there is 2 to carry over, both relays XIA and XIB are operated.

For denomination $2^3$, the circuit of the lamp LI depends on the four relays ZW, XW, WW and VW, representing digits of the partial products and the two relays XIA, XIB representing carry over amounts from denomination $2^2$. The circuits for the lamp LI and for relays XHA, XHB, XHC for carry over to the next higher denomination will be clear from comparison with those explained above, bearing in mind the two principles set out previously. When there is 1 to carry over to denomination $2^4$, one of the carry-over relays XHA, XHB, and XHC will operate; when there is 2 to carry over to denomination $2^4$, two of these relays will operate; and when there is 3 to carry over to denomination $2^4$, all three of these relays will operate.

The circuits of lamps LH, LG, LF, LE, LD, LC and LB will also be clear from the above explanation of the circuits for the lamp LJ. XGA, XGB, XGC, XGD are relays for the carry over from denomination $2^4$ to denomination $2^5$, XFA, XFB, XFC, XFD, XFE relays for carry over from denomination $2^5$ to denomination $2^6$ (shown in Fig. 3), XEA, XEB, XEC, XED, XEE for carry over from denomination $2^6$ to $2^7$, XDA, XDB, XDC, XDD from $2^7$, to $2^8$, XCA, XCB, XCC from $2^8$ to $2^9$, and XBA and XBB from $2^9$ to $2^{10}$. Relay A determines by its condition whether carry over is to take place into the highest denomination $2^{11}$. Contacts A1 thus determine whether lamp LA is to be operated for the digit of highest denomination in the solution.

Figure 4:
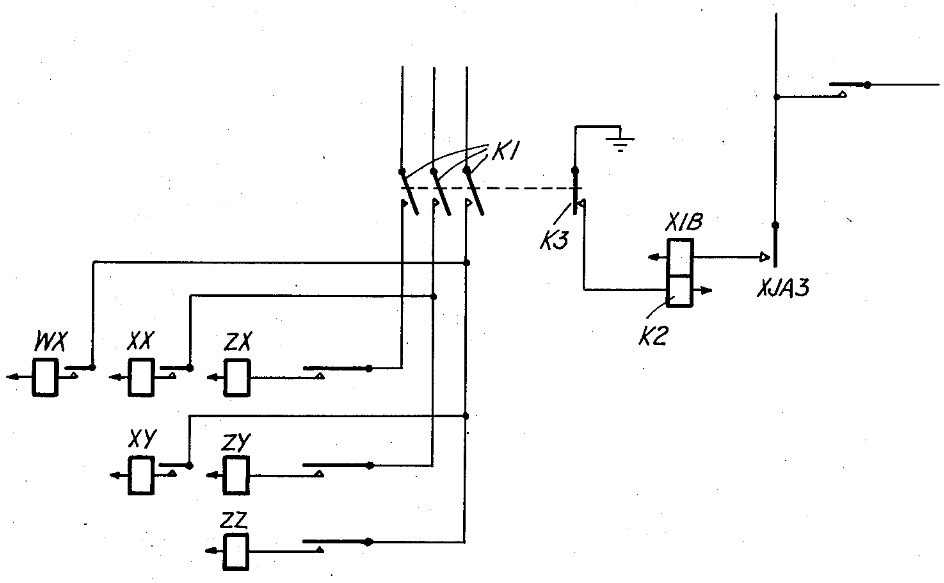
Fig. 4 is a circuit diagram of a portion of the circuit of Fig. 1 showing a modified form for obtaining an approximation.

It is clear that the circuits shown can be readily extended for the multiplication of numbers having any number of digits. In the case of numbers having a large number of digits, an approximate solution can be obtained by omitting the last three lamps in the circuits shown, so that the last three digits are always zero. Approximation to a certain number of significant figures may be obtained by omitting the relays of Fig. 1 for the unwanted digits and their associated relay chains and lamps of Figs. 2 and 3. For an approximation to N significant figures the relays for adding the partial products for the $(N+n)$ highest denominations in the solutions are retained, the others being omitted and N digits only exhibited in the solution. Generally $n$ would not be less than 3 but is value depends on the accuracy required. For this purpose certain of the relays in Fig. 1 may be connected into the circuits shown in that figure over the normally closed contacts of keys, which, when operated, accordingly remove those relays from the circuit. Suppose, for example, as indicated in Fig. 4, that relays ZX, XX, WX, ZY, XY and ZZ are connected through the normally closed keys K1 and the keys are thrown to remove them from circuit. Relays ZX, XX and WX will each represent 1 in the $2^2$ denomination; relays ZY and XY will each represent 1 in the $2^1$ denomination; and relay ZZ will represent 1 in the $2^0$ denomination. The maximum number that can be thus lost is $1+10+10+100+100+100$ (i. e. 10001) and the error thus introduced may be averaged by adding approximately one half of this number or a digital value 1 in denomination $2^3$. This may be done by providing an additional winding K2 on relay XIB of the $2^2$ denomination over which the relay is operated from a contact K3 of the key or keys which removed the relays ZX—ZZ from the circuits.

It is clear that, if it be desired to transfer the result of the multiplication to some other circuit, for further operations to be performed on such result, or for other purposes, the lamps LA, LL may be replaced by relays.

What is claimed is:

1. An electrically operated calculating apparatus for performing multiplication of numbers in binary form comprising a plurality of relays arranged electrically in rows with the last relay of each row lined up with the next to the last relay of the next adjacent row to form columns of relays corresponding to the columns used in longhand multiplication, there being a relay in each row for each digit of a multiplicand to be entered into said apparatus, an individual operating circuit for each relay including a switch to connect said relay to said operating circuit, a separate means for each row of relays simultaneously to control said switches associated with all the relays of that row, said operating circuits of each row being connected respectively to the circuits of all the other rows in the same sequence along the rows, means to energize said operating circuits for a combination of said relays determined by the digital values of a multiplicand entered into said apparatus, means to close the switches in a combination of rows of said relays determined by the digital values of a multiplier entered into said apparatus, a plurality of registering devices, there being one for each column of said relays, carry-over control devices for each column, separate energizing circuits associated respectively with said devices, the energizing circuits for a particular device containing contacts of the relays in the column of relays associated with that device, and means in each of said circuits controlled by the relays in the corresponding column, further means in each of said circuits controlled by the carry-over control devices of the next lower column, each of said circuits controlling the energization of its registering device so as to register a digital value for the corresponding denomination of the product of said multiplicand and said multiplier and to determine carry-over to the next higher denomination thereof.

2. An electrically operated calculating apparatus as defined in claim 1, in which the carry-over control devices of each column comprise additional relays, and in which said additional relays of each column control contacts in the energizing circuit of the next higher column.

3. An electrically operated calculating apparatus for performing multiplication of numbers in binary form comprising a plurality of relays arranged electrically in rows with the last relay of each row lined up with the next to the last relay of the next adjacent row to form columns of relays corresponding to the columns used in longhand multiplication, there being a relay in each row for each digit of a multiplicand to be entered into said apparatus, an individual operating circuit for each relay including a switch to connect said relay to said operating circuit, a separate means for each row simultaneously to control said switches associated with all the relays of that row, said operating circuits of each row being connected respectively to the circuits of all the other rows in the same sequence along the rows, means to energize said operating circuits for a combination of said relays determined by the digital values of a multiplicand entered in to said apparatus, means to close the switches in a combination of rows of said relays determined by the digital values of a multiplier entered into said apparatus, a plurality of registering devices, there being one for each column of said relays, carry over control devices for each column, separate energizing circuits associated respectively with said devices, means in each of said circuits controlled by the number of relays in the corresponding column, further means in each of said circuits controlled by the carry over control devices of the next lower column, each of said circuits controlling the energization of its registering device so as to register a digital value for the corresponding denomination of the product of said multiplicand and said multiplier and the operation of the carry-over control devices to determine carry-over to the next higher denomination thereof, and means to disconnect certain of said relays corresponding to a predetermined number of digits at the end of said product and the corresponding registering devices to carry over a value of 1 to the denomination next above the highest denomination of the disconnected relays, whereby an approximation of the product is obtained as a predetermined number of significant digits.

4. Electrically operated apparatus for multiplying a multi-digit multiplicand, expressed in radix two, by a multi-digit multiplier, also expressed in radix two, comprising a single series of relays representing the respective digits of the multiplier, a plurality of series of relays representing the respective digits of each successive partial product obtained by the successive multiplication of the complete multiplicand by the respective digits of the multiplier, the number of such partial products and therefore the number of series of such partial product relays being thus equal to the number of digits of the multiplier, means including contacts operated by said single series of multiplier relays for controlling energization of said plurality of series of partial product relays, a plurality of index elements, means including a plurality of parallel circuits, each said circuit including one of said index elements and each also including contacts for controlling energization of said index elements, which contacts are operated by distinct groups of partial product relays, and which distinct groups include relays representative of successive partial products, said index elements adapted to indicate the sum of all said partial products.

5. Apparatus, as defined in claim 4, wherein said last-named means includes the contacts of a plurality of carry-over relays and circuits for energizing said relays, the energizing circuit for each of said carry-over relays including at least one contact of a partial product relay representing a preceding order from that of the index element controlled by said relay.

GEORGE CLIFFORD HARTLEY.
WILLIAM JOHN REYNOLDS.

References Cited in the file of this patent

UNITED STATES PATENTS

| Number | Name | Date |
|---|---|---|
| 2,192,612 | Lang et al. | Mar. 5, 1940 |
| 2,318,591 | Couffignal | May 11, 1943 |

FOREIGN PATENTS

| Number | Country | Date |
|---|---|---|
| 410,129 | Great Britain | May 9, 1934 |